United States Patent [19]

Ward

[11] Patent Number: 4,583,709
[45] Date of Patent: Apr. 22, 1986

[54] VALVES

[75] Inventor: Richard Ward, Worsley, England

[73] Assignee: Dobson Park Industries P/C, Nottingham, England

[21] Appl. No.: 620,502

[22] Filed: Jun. 14, 1984

[30] Foreign Application Priority Data

Jun. 14, 1983 [GB] United Kingdom ............... 8316137

[51] Int. Cl.[4] ............................................. F16K 31/06
[52] U.S. Cl. ......................... 251/129.15; 251/129.03; 251/129.12; 251/129.20; 137/596.17; 318/345 B
[58] Field of Search ............... 251/133, 134, 251, 284, 251/263, 130, 138, 136; 137/596.17; 318/160, 345 B, 345 F, 374, 138, 254

[56] References Cited

U.S. PATENT DOCUMENTS

| | | | |
|---|---|---|---|
| 1,966,336 | 7/1934 | Dewey | 251/263 |
| 2,484,628 | 10/1949 | Valley | 251/263 |
| 2,975,349 | 3/1961 | Green | 318/345 B |
| 4,176,687 | 12/1979 | Ensign | 251/263 |
| 4,325,011 | 4/1982 | Peterson | 318/345 B |

FOREIGN PATENT DOCUMENTS

| | | | |
|---|---|---|---|
| 222968 | 8/1962 | Austria | 251/263 |
| 706142 | 3/1954 | United Kingdom | 251/263 |
| 1264155 | 2/1972 | United Kingdom | 251/251 |

Primary Examiner—Larry Jones
Assistant Examiner—Noah Kamen
Attorney, Agent, or Firm—Murray, Whisenhunt & Ferguson

[57] ABSTRACT

An electrically operated valve assembly comprises a valve, an electrical device 18 to operate the valve in one direction, and means 19 to prevent reverse current flow if the valve should drive the electrical device in reverse when the valve moves in a direction opposite to the said one direction. In the embodiment shown the valve has a plunger controlled by a cam, the cam being driven by a motor 18. The valve may however also be controlled by a solenoid.

12 Claims, 11 Drawing Figures

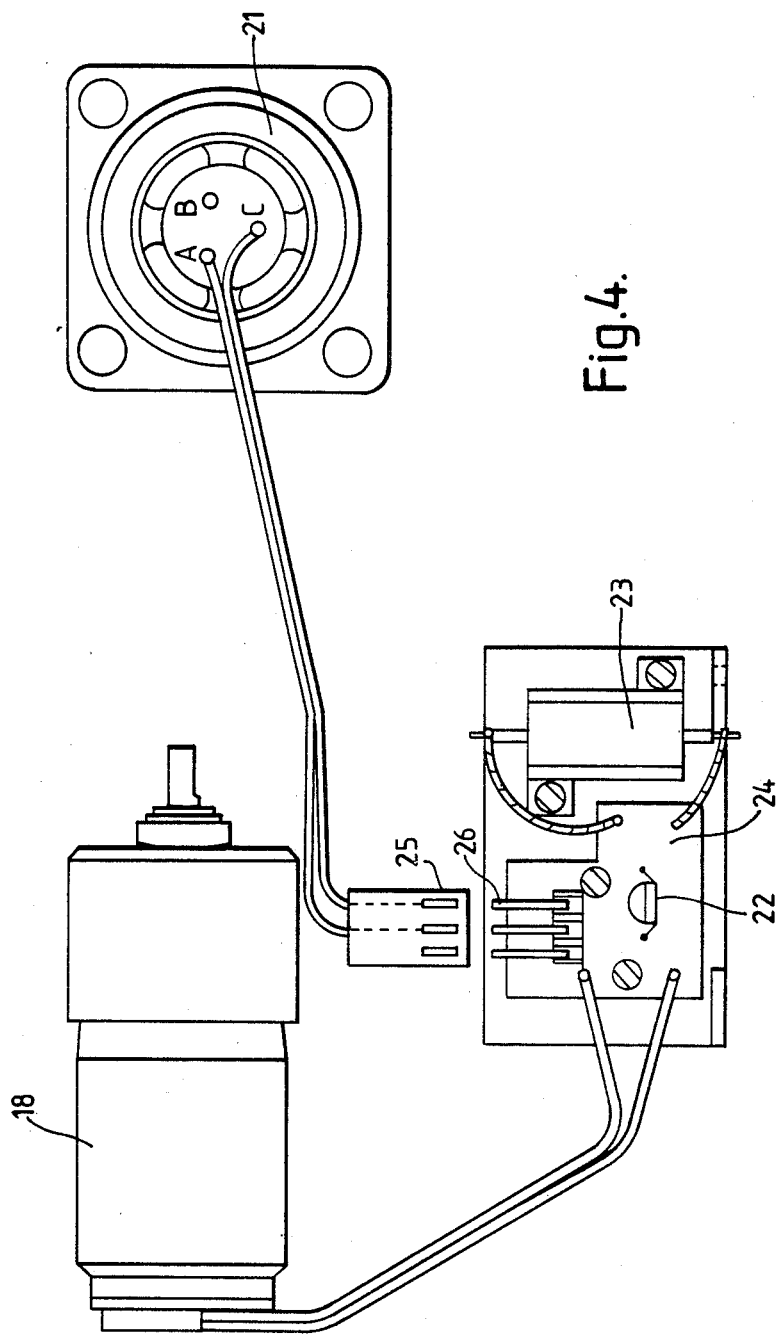

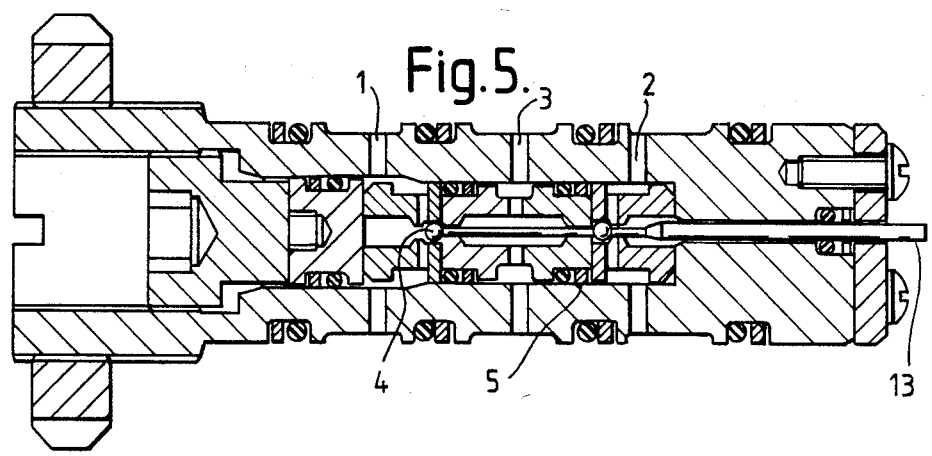
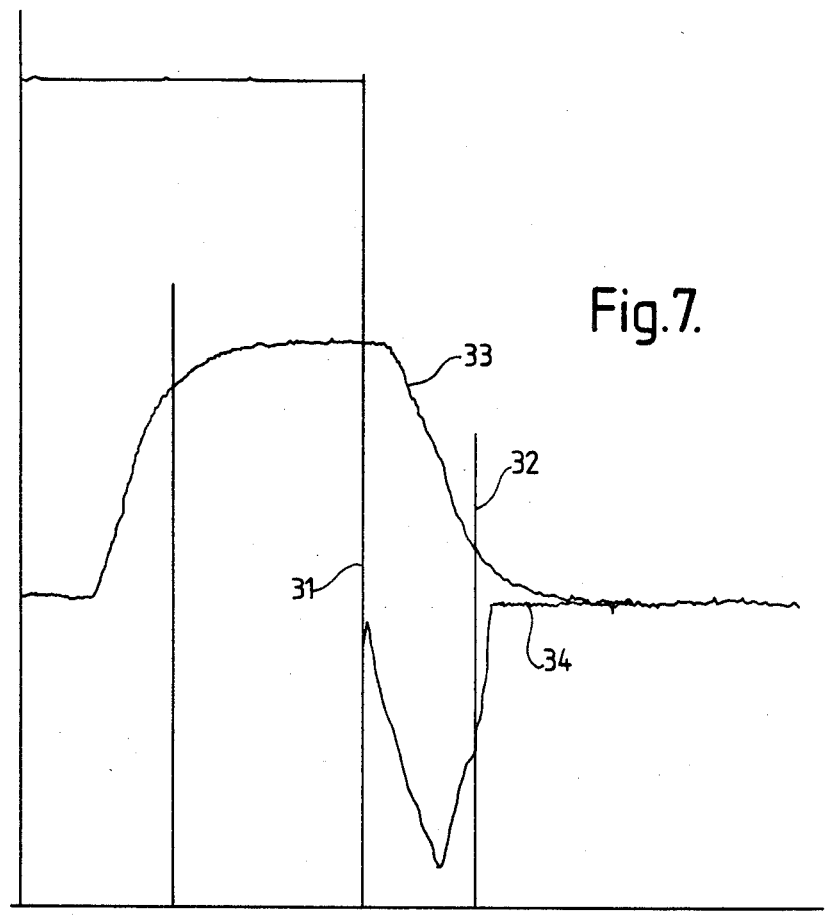

4,583,709

VALVES

BACKGROUND TO THE INVENTION

The invention relates to valves and particularly to electrically operated valves.

DESCRIPTION OF THE PRIOR ART

Our co-pending U.K. Patent Application No. 8307541 described an electric motor operated valve for use in controlling the functions of a hydraulic mine roof support. It is important for such valves to be intrinsically safe, i.e. they should present very little risk of an underground explosion due for example to the ignition of methane gas by a release of electrical energy. The valve described in U.K. Patent Application No. 8307541 requires very little power.

One important embodiment of the valve described in U.K. Patent Application No. 8307541 is arranged so that in use the valve is maintained in an open position by a sustained supply of power to a permanent magnet electric motor, the motor being capable of continuous actuation in a stalled condition without damage. When power to the moter is switched off the valve returns to its closed position under the influence of hydraulic pressure.

We have now discovered that such a valve presents a problem in that when the valve closes, it drives the motor in the reverse direction, causing the motor to act as a generator so that a voltage of reverse polarity appears at its terminals.

It has been proposed to include in the motor circuit a reverse voltage supression diode but the current through the diode causes a braking torque on the motor which slows down the operation of the valve.

SUMMARY OF THE INVENTION

According to the invention an electrically operated valve assembly comprises a valve, an electrical device to operate the valve in one direction, a means to prevent reverse current flow if the valve should drive the electrical device in reverse when the valves moves in a direction opposite to the said one direction.

Although the circuit has been developed with particular reference to motor operated valves the same problems can arise with solenoid operated valves due to the back E.M.F generated when a solenoid is de-energised (i.e. switched off) and the invention is equally applicable to solenoid operated valves.

Preferably the means to prevent reverse current flow comprises a switching device which effectively produces an open circuit if the electrical device is driven in reverse.

Preferably the switching device comprises a transistor.

Preferably a back up circuit is provided to short circuit any reverse current in the event of the switching device failing.

The back up circuit may include a diode.

BRIEF DESCRIPTION OF THE DRAWINGS

FIG. 4 shows the electrical equipment of the device, to a larger scale;

FIG. 5 is a cross-sectional view through the valve of the device;

FIG. 7 is a graph illustrating the hydraulic pressure and voltage with a prior art valve device;

DESCRIPTION OF EMBODIMENTS OF THE INVENTION

Figure 1:
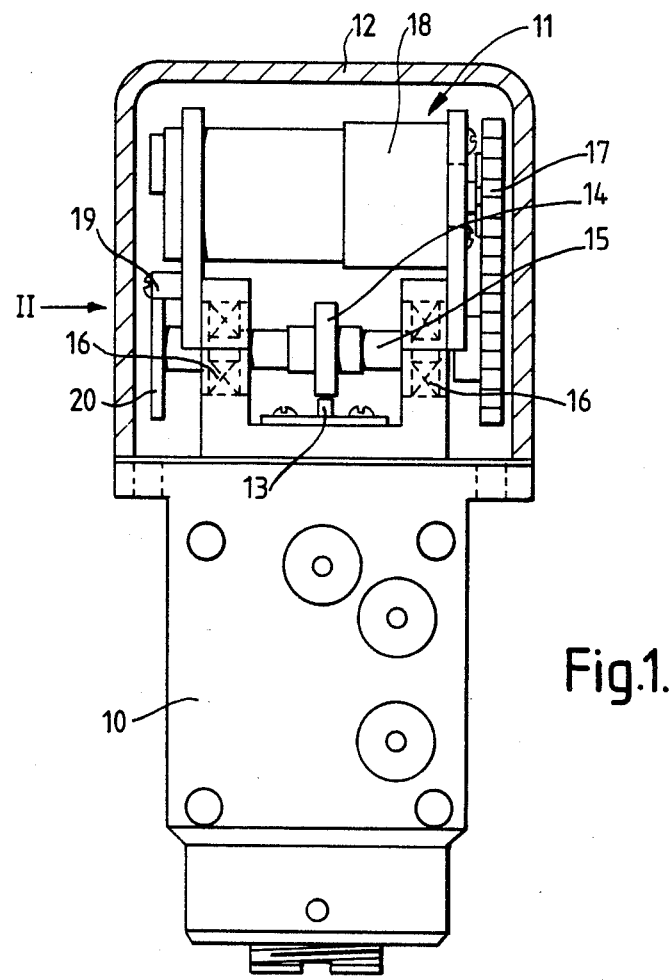
FIG. 1 is a side view of a first embodiment of valve assembly according to the invention, partly in section.

The embodiment according to the invention illustrated in FIG. 1 comprises a valve 10 and an electrical operating device 11 which is mounted on the valve 10 under a cover 12. The valve 10, which is operated by a push rod 13, is identical to the valve described in our co-pending U.K. Patent Application No. 8307541. As shown in FIG. 5, the valve has inlet ports 1, outlet ports 2, service ports 3 and ball members 4, 5, controlled by the push rod 13 to direct fluid either from the inlet port to the service port, or from the service port to the outlet port.

The device 11 includes an eccentric cam 14 which is mounted on a shaft 15 which in turn is mounted in bearings 16. The eccentric cam 14 bears on the top of the push rod 13.

The shaft 15 is coupled by a gear train 17 to an electric motor 18.

When no power is connected to the motor 18, hydraulic pressure within the valve maintains the push rod 13 in a raised position and the eccentric cam 14 lies in one limiting position, the limiting position being defined by the engagement of a stop 19 with a sector plate 20.

When the power is supplied to the motor the motor rotates the eccentric cam 14 via the gear train 17 to a new limiting position defined by engagement of the stop 19 with another face of the sector plate 20. In this limiting position the push rod 13 is depressed to hold the valve in a open condition connecting ports 1 and 3 and isolating port 2. When power is removed from the motor again, the valve closes under the influence of the hydraulic pressure within the valve and pressure of the push rod 13 on the eccentric cam 14 returns the electric cam to its original limiting position, thus driving the motor 18 in reverse.

As best seen in FIG. 4 the motor 18 is connected to a pin connector 21 (by means of which it may be coupled to a power source) via a constant current source 22, current setting resistor 23 and a printed circuit 24. Reference numerals 25 and 26 respectively designate a connector block and connecting pins.

The new electrical circuit is best described with reference to FIG. 6. Arranged in series between two connecting pins 27 and 28 is the constant current source 22 (coupled to the current setting resistor 23), the motor 18, and the transistor 19. A further resistor 29 is, connected from the base of the transistor to the opposite terminal of the motor 18. A diode 30 is connected across the terminals 27 and 28.

When power is supplied to the motor to open the valve 10, the transistor 19 is turned on via the base resistor 29 which is connected to the normally positive terminal of the motor. Thus current can flow from the power source through the motor and the motor operates normally to operate the valve.

When the power supplied is turned off, to enable the valve to close, closure of the valve causes the motor to act as a generator and generate a reverse voltage. However the base of the transistor is now connected to the most negative point in the circuit and the transistor is turned off, effectively producing an open circuit so that the motor can effectively free wheel with no braking torque. Thus no reverse voltage appears at the connecting pins 27 and 28.

Should the transistor 19 fail so that there is no longer an open circuit when the motor is being driven in reverse, the reverse current is short circuited through the diode 30 and so only the forward conducting voltage of the diode (i.e. 34 in FIG. 8) appears across the connecting pins 27 and 28. Thus the diode 30 provides a back up safety circuit should the transistor 19 fail.

Figure 6:
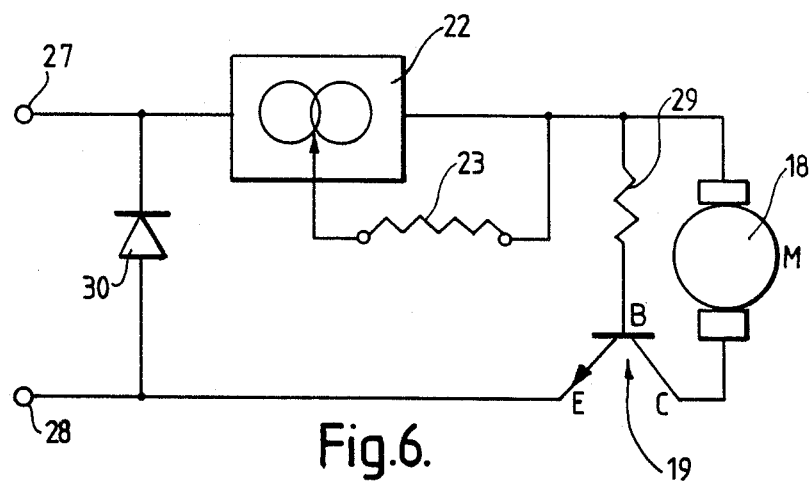
FIG. 6 illustrates the electrical circuit of the device, with reverse current flow prevention transistor circuit and diode.
Figure 2:
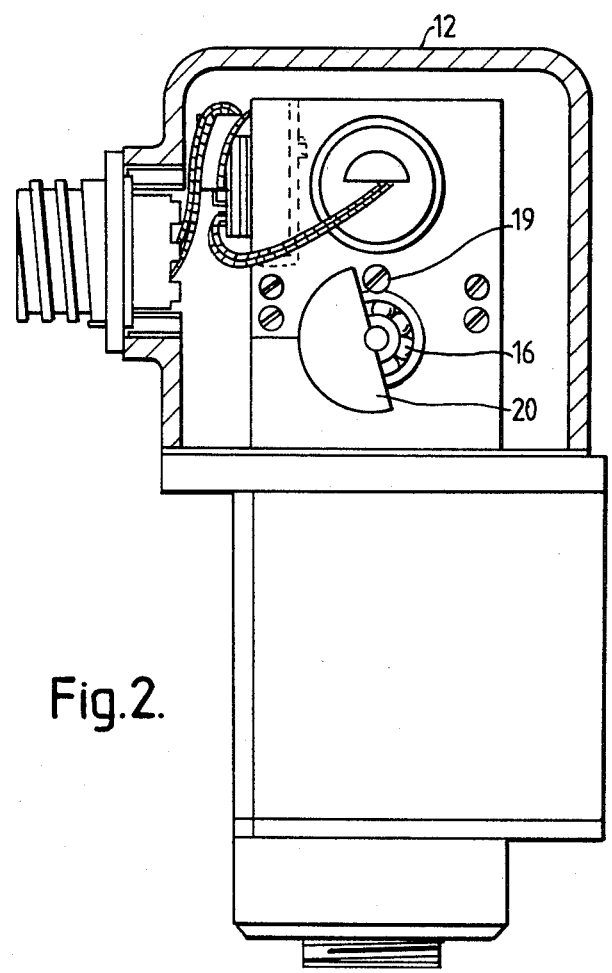
FIG. 2 is a view in the direction of arrow II of FIG. 1, again partly in section.

FIG. 7 illustrates the response of a valve arranged in a circuit similar to that shown in FIG. 6 but without any diode or transistor. The vertical axis indicates the point at which the motor is switched on, vertical line 31 illustrates the point at which the motor is switched off and vertical line 32 illustrates the point at which pressure in the valve has fallen to 20% of its maximum value, giving a measure of the rate at which the valve closes. Line 33 illustrates the pressure in the valve and line 34 illustrates the voltage across the connecting pins 27 and 28.

It will be seen that when the motor is switched off a substantial reverse voltage occurs.

Figure 8:
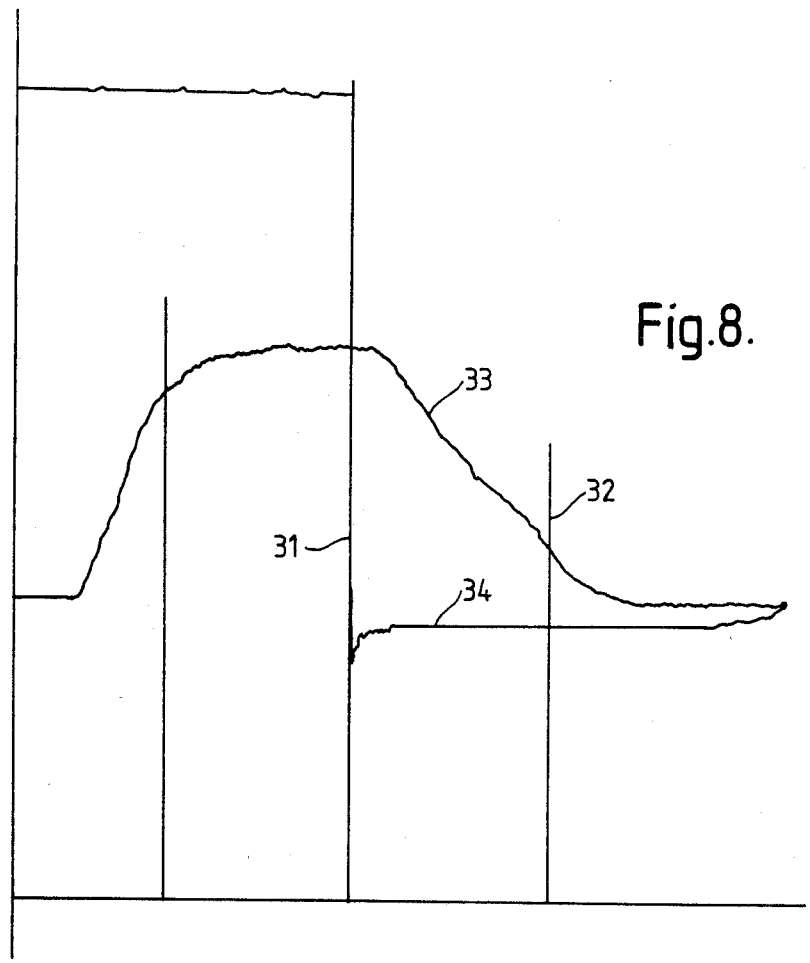
FIG. 8 is a similar graph but relating to a prior art valve with only a reverse voltage suppression diode added.

FIG. 8 is a graph similar to FIG. 7 but illustrating the conditions if diode 30 is used without the transistor 19. It will be seen that the reverse voltage is limited by the diode but the closing time of the valve is considerably increased because of the braking torque on the motor which is produced by the reverse current flowing through the diode.

Figure 9:
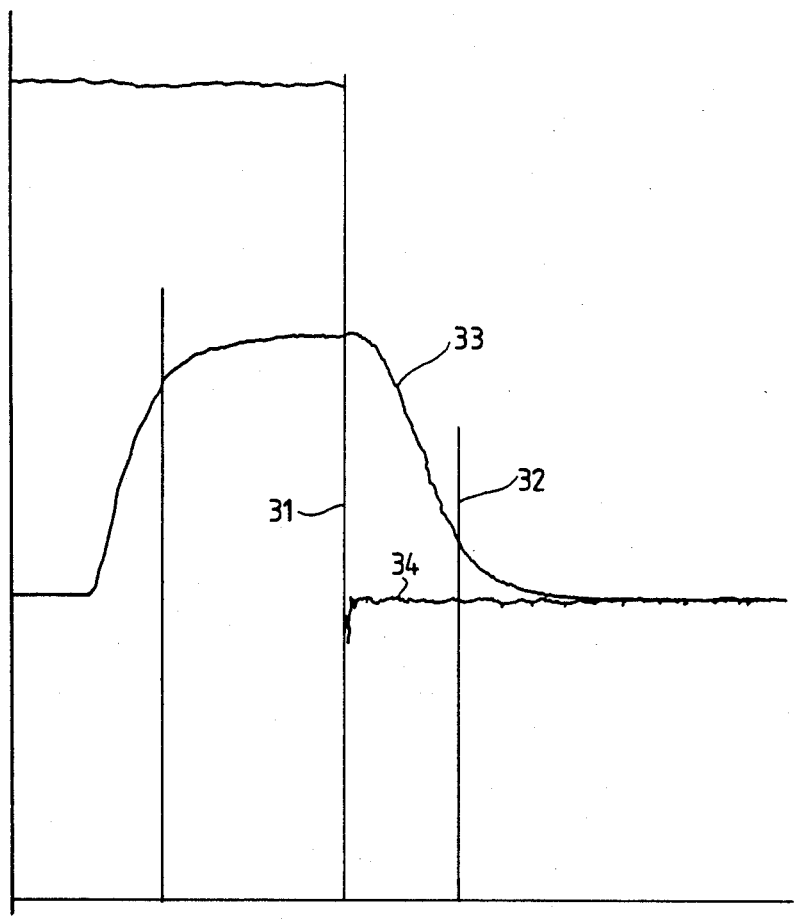
FIG. 9 is a similar graph but related to the valve forming the subject of this embodiment.

FIG. 9 is a further graph illustrating the performance of the valve forming the subject of this embodiment. It will be seen that the reverse voltage has been eliminated but the closure time of the valve is comparible with that shown in FIG. 7.

Figure 10:
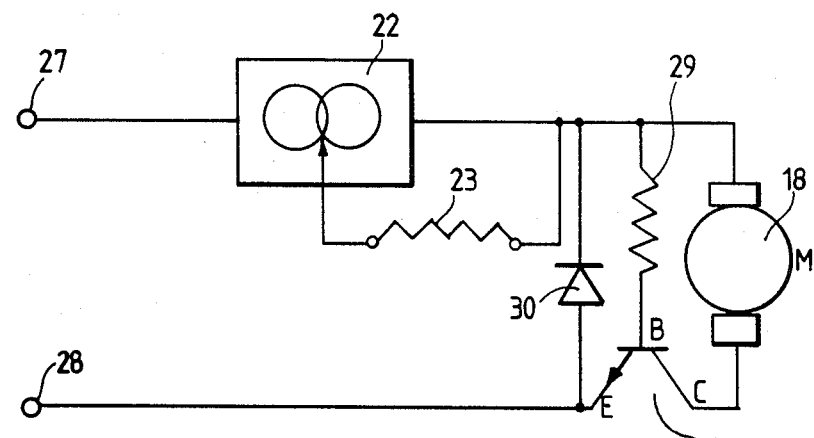
FIG. 10 illustrates the circuitry of an alternative embodiment of the device according to the invention.
Figure 3:
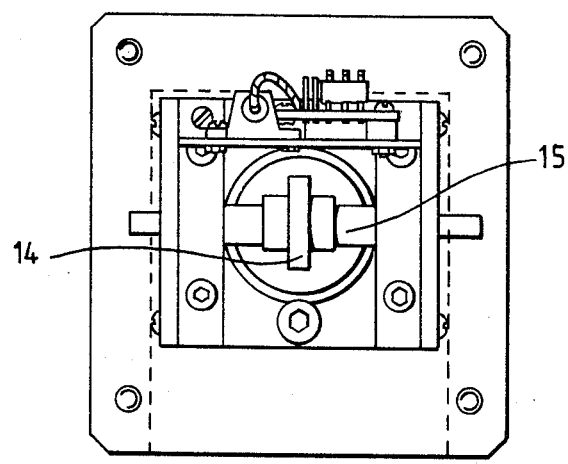
FIG. 3 is a plan view of the assembly with a cover and motor removed.

FIG. 10 illustrates an alternative arrangement of circuitry in which the diode 30 is positioned on the opposite side of the constant current source 22. By positioning the diode here, the constant current device can be relied upon to act as a blocking diode should the polarity of the supply to the connecting pins 27 and 28 accidentally be reversed.

Figure 11:
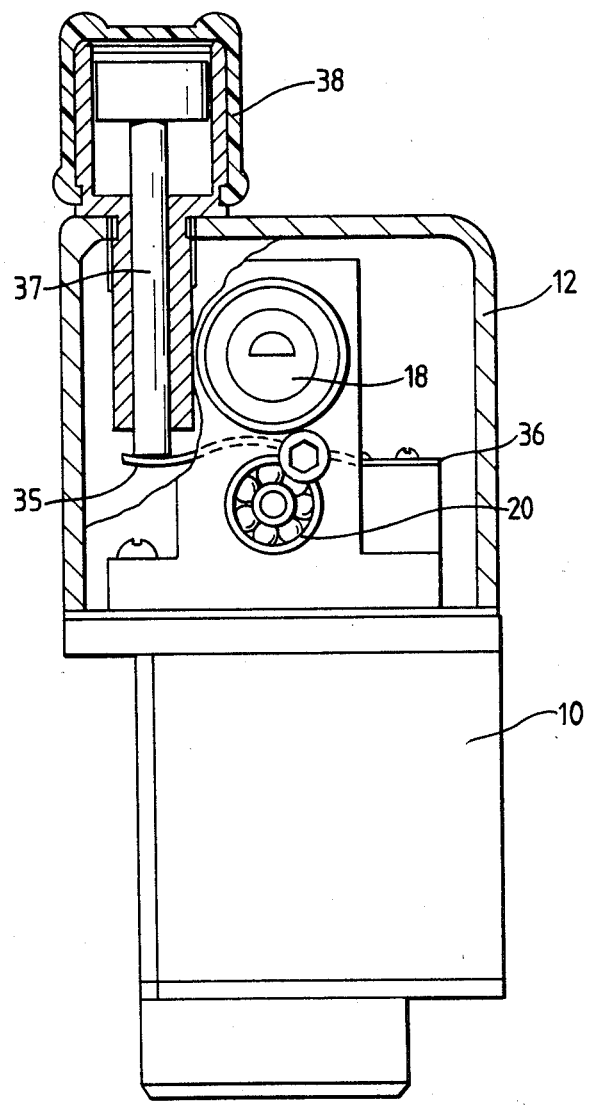
FIG. 11 is a view similar to FIG. 2 but illustrating yet another embodiment according to the invention.

FIG. 11 illustrates an alternative embodiment of device fitted with a manual over ride. A leaf spring 35 is fixed at one end 36 and extends over the eccentric cam, the free end of the leaf spring engaging underneath a plunger 37 which is protected by a rubber boot 38. Manual pressure on the rubber boot 38 moves the plunger downwardly causing the leaf spring to press against the eccentric cam and rotate the cam to a position in which it depresses the push rod 13 and opens the valve.

The invention is not restricted to the details of the foregoing embodiments.

I claim:

1. An electrically operable valve assembly useable in a mine roof support comprising: a valve means;
   an electrical operating means having an electromagnet, said operating means being controllingly connected to said valve means and said operating means being driveable to function as a generator by said valve means;
   means for preventing reverse current flow when said operating means functions as a generator comprising: a transistor with a collector, an emitter, and a base, one of the collector and emitter being connected to a first side of the electromagnet, said base being connected to one side of a resistor and the other side of the resistor being connected to a second side of the electromagnet;
   power supply and return lines for energizing said electromagnet, the other of the collector and emitter being connected to one of supply and return lines, and the other of said supply and return lines being connected to said second side of said electromagnet; and
   a backup short circuiting means connected across said other of the collector and emitter and the other of said supply and return lines, for short circuiting any reverse current.

2. A valve assembly as claimed in claim 1, in which said valve means includes an inlet port and an outlet port.

3. A valve assembly as claimed in claim 2, in which said valve means also includes a service port.

4. A valve assembly as claimed in claim 1, in which said valve means has displaceable sealing members.

5. A valve assembly as claimed in claim 4, in which said electrical operating means is a motor.

6. A valve assembly as claimed in claim 1, in which said valve is motor operated.

7. A valve assembly as claimed in claim 1, in which said electrical operating means is a solenoid.

8. A valve assembly as claimed in claim 1, in which said backup circuit means comprises a diode.

9. A valve assembly as claimed in claim 1, in which said valve means has an operating push rod controlled by a motor driven cam.

10. A valve assembly as claimed in claim 9, in which said cam has limiting positions defined by engagement of stop means and a sector plate.

11. A valve assembly as claimed in claim 10, in which said limiting positions are such that said cam is rotatable through an arc of less than 360°.

12. A valve assembly as claimed in claim 1, and further including a manual over-ride device for enabling manual operation of said device.

* * * * *